Nov. 3, 1936.  E. E. MURPHY  2,059,386

SHOE AND METHOD OF MANUFACTURING THE SAME

Filed July 26, 1933

INVENTOR.
Everett E. Murphy
By his Attorney
Victor Cobb

Patented Nov. 3, 1936

2,059,386

UNITED STATES PATENT OFFICE 2,059,386

SHOE AND METHOD OF MANUFACTURING THE SAME

Everett E. Murphy, Newburyport, Mass., assignor to United Shoe Machinery Corporation, Paterson, N. J., a corporation of New Jersey Application July 26, 1933, Serial No. 682,215

2 Claims. (Cl. 12—142)

This invention relates to shoes and methods of manufacturing the same and is herein illustrated in its application to the manufacture of pre-welted shoes.

The welt of a pre-welted shoe is attached to the upper before the upper is placed on the last by means of stitching extending from the inner surface of the lining through to the under surface or flesh side of the welt. The welting most generally used in the manufacture of pre-welted shoes is rectangular in cross section and the apex of the angle formed by the upper surface of the welt and the outer surface of the upper and commonly called the welt crease is substantially coincidental with the seam uniting the welt and upper. In the lasting of the shoe, particularly about the toe end, the upper is likely to be stretched somewhat and this stretching operation strains the stitching which unites the welt and upper and sometimes separates the welt and upper at the seam line sufficiently to leave the stitching objectionably conspicuous in the finished shoe, thereby producing what is known to the trade as a "grinning" seam. This condition, while it does not necessarily affect the durability or wearing qualities of the shoe, tends to impair its attractiveness.

An object of the present invention is to provide a shoe construction particularly applicable to the manufacture of pre-welted shoes for obviating the occurrence of grinning seams. Accordingly, a preferred embodiment of the invention comprises a pre-welted shoe characterized by the provision in the upper-engaging face of the welt of a relatively narrow groove extending lengthwise of the welt and bounded on one side by a plane surface extending to the inner edge face of the welt and bounded on the opposite side by the exposed top face of the welt, and characterized further by the provision in the overlasted margin of the upper of a narrow width of upper material which is offset relatively to the major portion of the overlasted margin and is seated in said groove.

The invention also comprises an improvement in methods of making pre-welted shoes which consists in forming a relatively narrow groove in the upper-engaging face of the welt and stitching the welt to the upper along the line of said groove. In order to reduce the thickness of the margin of the welt adjacent to its inner edge face, part of the outsole-engaging face of the welt is cut away. The welt-stitching operation bends a narrow width of upper material into the groove provided in the welt, thus providing a section of upper material which is offset relatively to the major portion of the overlasting margin. The stitching operation also bends the inner margin of the welt downwardly on the line of the welt seam thereby restoring the original flat condition of the outsole-attaching face of the welt.

The various features and aspects of the invention will appear more fully from the following description when read in connection with the accompanying drawing and will be pointed out in the appended claims.

Figure 1:
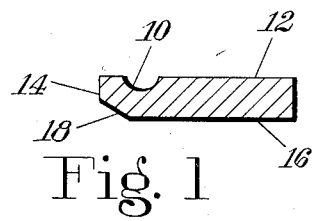
Fig. 1 is a cross sectional view of a strip of grain welting embodying features of the present invention.

In Fig. 1 there is illustrated a portion of welting consisting of a strip of grain leather having a groove 10 formed in its grain side 12 near its inner edge face 14. The groove is preferably half round in cross section and somewhat wider than the thread which forms the stitch 20 (Fig. 3) which secures the welt 26 to an upper 24. The groove 10 extends longitudinally of the welting parallel to the inner edge face 14. In order to provide welting having a relatively thin inner marginal portion the flesh side or sole engaging surface 16 of the welting has a bevel 18 formed at its inner edge conterminous to the edge face 14.

Figure 3:
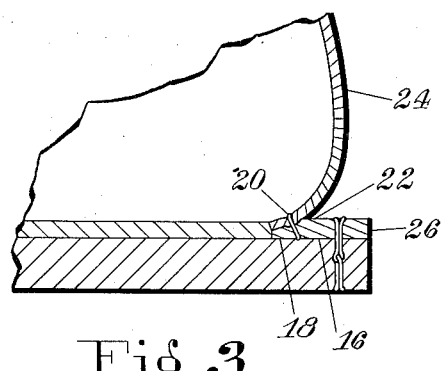
Fig. 3 is a cross sectional view showing the welting of Fig. 1 in a portion of a finished shoe.
Figure 5:
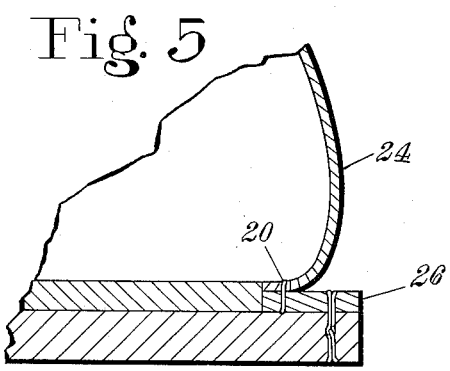
Fig. 5 is a cross sectional view of the toe end of a pre-welted shoe illustrating a prior construction.

Referring now to Fig. 3 in which welting such as that illustrated in Fig. 1 is shown in a portion of a finished shoe, it will be seen that the beveled surface 18 of the welting has been brought into the plane of the flesh side 16 and the groove 10 has been tipped transversely thereof downwardly and inwardly of the welt. The groove 10 has been spread somewhat by stitching the welt to the upper and the portion of the upper through which the stitching 20 passes has been drawn into the groove 10 and thereby offset from the remainder of the overlasting margin. It will be seen that welting constructed as shown in Fig. 1, and attached to the upper by means of stitching 20 arranged to pass through the groove 10 of the welt provides a shoulder 22 which serves to conceal the stitching 20 in the finished shoe. Referring to Fig. 5, which illustrates a common commercial construction of pre-welted shoes, it will be seen that even a slight stretching of the seam 20, with a resulting separation of the upper 24 and welt 26 at the seam line, would leave a portion of the seam 20 exposed to view, and cause a "grinning" seam. In the construction illustrated in Fig. 3, however, it is apparent that a slight stretching of the seam 20 with a resulting separation of the upper and the welt at the seam line would not leave the seam conspicuous in the finished shoe; in fact, in the absence of an excessive strain upon the welt and upper in lasting, the seam 20 of Fig. 3 would not be visible at all.

It is apparent from a comparison of Fig. 3 and Fig. 5 that the groove 10 and bevel 18 formed in the welt shown in Fig. 1 have substantially reduced the bulk of the stock through which the seam 20 passes.

Figure 2:
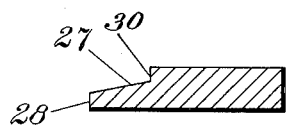
Fig. 2 is a cross sectional view of a strip of grain welting illustrating an alternative construction.
Figure 4:
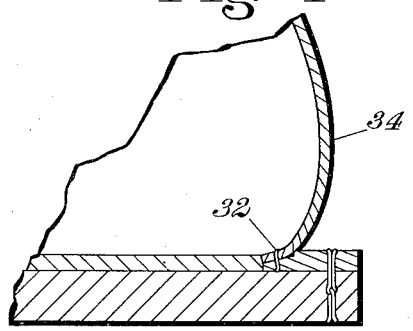
Fig. 4 is a cross sectional view showing the welting of Fig. 2 in a portion of a finished shoe.

Referring now to Figs. 2 and 4, illustrating an alternative construction of the welting, a rabbet 27 is formed longitudinally of the welting in its upper engaging or grain surface at its inner edge and arranged to extend outwardly from the inner edge 28 of the welting beyond the line on which the stitching is to be located to unite the welt and upper. The longitudinal rabbet 27 provides a stitch concealing shoulder 30 and also provides a welting having a relatively thin inner marginal portion. The upper 34 is united to the welt by stitching 32 arranged to pass through the rabbeted portion of the welt. The stitching 32 has a tendency to draw the upper 34 into the angle in the welt provided by the rabbet 26.

Thus it will be seen that in the construction illustrated in Fig. 4, as in the construction illustrated in Fig. 3, there is a space between the apex of the welt crease and the seam 32 uniting the welt and upper and it is apparent that the stretching of the upper 34 in lasting the shoe may stretch the seam 32 somewhat without leaving it exposed to view in the finished shoe.

Having described my invention, what I claim as new and desire to secure by Letters Patent of the United States is:

1. A pre-welted shoe characterized by the provision in the upper-engaging face of the welt of a relatively narrow groove extending lengthwise of the welt and bounded on one side by a plane surface extending to the inner edge face of the welt and bounded on the opposite side by the exposed top face of the welt, and characterized further by the provision in the overlasted margin of the upper of a narrow width of upper material which is offset relatively to the major portion of the overlasted margin and is seated in said groove.

2. That method of making pre-welted shoes which consists in forming a relatively narrow longitudinal groove in the upper-engaging face of the welt adjacent to its inner edge face, reducing the thickness of the margin of the welt adjacent to said inner edge face by cutting away part of the outsole-engaging face of the welt, and stitching the welt to the upper along the line of said groove thereby bending into said groove a narrow width of upper material and thus providing in the overlasting margin of the upper a section which is offset relatively to the major portion of the overlasting margin and is seated in said groove, the stitching of the welt to the upper also acting to bend the inner margin of the welt downwardly on the line of the seam thereby restoring the original flat condition of the outsole-attaching face of the welt.

EVERETT E. MURPHY.